UNITED STATES PATENT OFFICE.

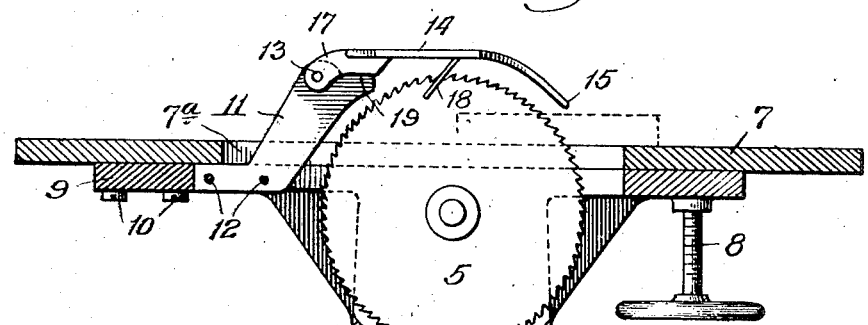
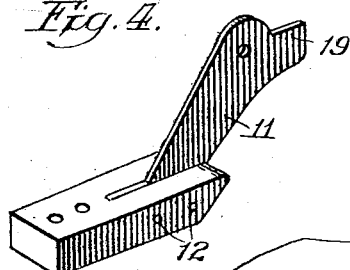
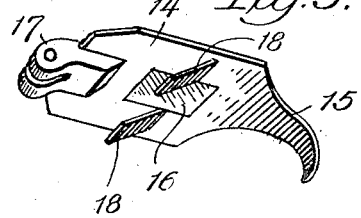
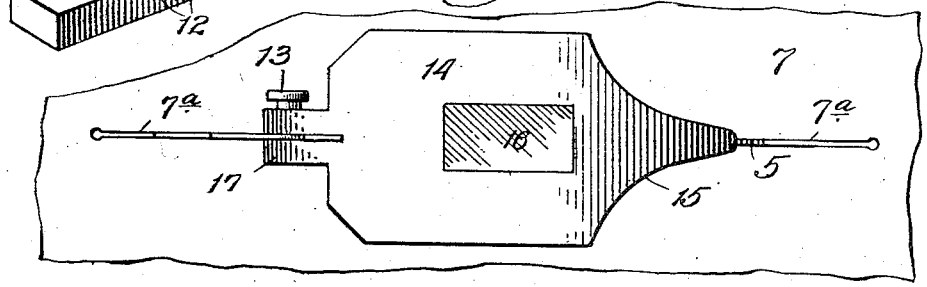
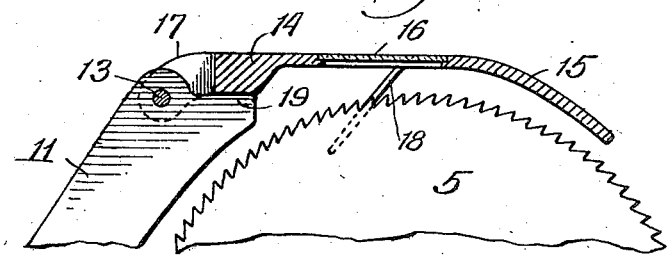

HENRY F. WALTERS, OF CHICAGO, ILLINOIS.

SAW-GUARD.

1,312,671.

Specification of Letters Patent.

Patented Aug. 12, 1919.

Application filed July 5, 1918. Serial No. 243,290.

*To all whom it may concern:*

Be it known that I, HENRY F. WALTERS, a citizen of the United States, and a resident of Chicago, in the county of Cook and State of Illinois, have invented certain new and useful Improvements in Saw-Guards, of which the following is a full, clear, and exact description.

The invention relates to saw guards and more particularly to those adapted for use in connection with metal saws used for cutting electrotypes and the like. In work of this character, it is essential that the guard be of such a character that it will not interfere with the accurate cutting of the work.

The object of the invention is to provide an improved saw guard adapted for use in connection with metal saws which permits the operator to see the cut while it is being made, for accuracy in cutting, which will prevent injury to the operator by chips from back-cutting, and which will efficiently protect the operator.

The invention consists in the several novel features hereinafter set forth and more particularly defined by claims at the conclusion hereof.

In the drawings: Figure 1 is a side elevation of the saw equipped with the invention, parts being shown in section. Fig. 2 is a plan. Fig. 3 is a vertical longitudinal section. Fig. 4 is a detail perspective of the support for the guard. Fig. 5 is a detail perspective of the guard.

The invention is illustrated in connection with a circular saw 5 which is mounted in a suitable support 6 and a table 7, having a slot therein through which the saw projects, is pivotally sustained by the support 6, so that the saw may receive the necessary attention, all of which may operate and be constructed as well understood in the art. Usually an adjusting screw 8 is provided between the support 6 and the table 7.

The improved support for the saw guard comprises a block 9 which is adapted to be secured to the underside of the table 7 by screws 10 and an arm 11 formed of thin or plate metal and extended into a kerf in the block and secured thereto by rivets 12. The arm 11 is adapted to extend through the saw slot 7ª in the table and extends upwardly and forwardly along the back of the saw and the guard is pivotally connected thereto by a screw 13. The improved guard comprises a body portion 14 which is substantially flat transversely, is disposed over the saw and has no sides, so that the work will be accessible to the operator at the sides of the saw. This guard is of considerable width, so as to effectively prevent the hands of the operator coming in contact laterally with the upper portion of the saw and its front end is tapered nearly to a point, as at 15, which is disposed above the table 7 and adjacent the saw. As a result of this formation, the guard will be supported at a sufficient elevation above the table to permit the work to be pushed backwardly against the saw without visual obstruction to the operator, and this is a very important factor in sawing electrotypes, stereotypes and the like, and, furthermore, the edges of the guard will serve to deflect the fingers of the operator laterally away from the saw when they come near the saw teeth. A plate of glass or other suitable transparent material 16 is secured in the top of the guard so that the operator can also see the portions of the work at the back and sides of the saw. At its rear, the guard 14 is provided with ears 17, one of which is screw-threaded for the thumb screw 18, so that the ears can, if desired, be clamped firmly against arm 11 to frictionally hold the guard in elevated position. Plates 18 are secured to the underside of the guard 14 to trap any chips of metal from the back saw, from being deflected toward the operator. In sawing electrotypes, etc., it is desirable to avoid contact between the guard and the work and by means of clamp-screw 13, the guard may be adjusted to avoid this.

The invention exemplifies a guard in which the cutting point is always visible to the operator, so that the cutting can be accurately done and this result is attributable to the converging or pointed front end, the relatively wide flat body serving to effectively protect the arms and hands of the operator from contacting with the saw laterally from the sides thereof. Furthermore, the tapered edges 15 of the guard act to deflect the fingers of the operator as the work is being moved backwardly, if the fingers are brought near the saw-teeth. The block 10 furnishes a rigid metal support for the arm 11, which is limited in thickness, so that it will pass through the kerf in the work, which can be rigidly secured and conveniently secured to the underside of the table. In mortising a plate, the wide upper portion of the guard prevents chips from the back of the saw being thrust toward or into the eyes of the operator. When a plate is to be mortised, it is customary to make the cut with the rear and upper portion of the saw and in doing so, the arm 11 acts as a guide for the work and the window 16 makes it possible for the operator to see the saw and the work.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a saw guard, the combination of a support, and a guard carried by said support and having its front end tapered to deflect the fingers of the operator and render the work visible while it is being cut.

2. In a saw guard, the combination of a support and a guard adapted to extend continuously over the saw carried by said support and having its front end curved downwardly and tapered to deflect the fingers of the operator and render the work visible while it is being cut.

3. In a saw-guard, the combination of a support, a plate adapted to extend continuously over a saw and extending transversely thereof, means for supporting the plate, and downwardly extending strips on the underside of the plate to trap the chips from the back of the saw.

HENRY F. WALTERS.